UNITED STATES PATENT OFFICE.

JOHN WOOD LEADBEATER, OF LEEDS, ENGLAND.

ARTIFICIAL FUEL.

SPECIFICATION forming part of Letters Patent No. 622,373, dated April 4, 1899.

Application filed November 18, 1897. Serial No. 659,007. (No specimens.)

*To all whom it may concern:*

Be it known that I, JOHN WOOD LEADBEATER, engineer, a subject of the Queen of Great Britain and Ireland, residing at 55 Banstead Grove, Roundhay road, Leeds, in the county of York, England, have invented certain Improvements in the Manufacture of Artificial Fuel, of which the following is a specification.

This invention has reference to the production of insoluble briquets or blocks of so-called "artificial fuel;" and it has for its object the manufacture of briquets enriched with a petroleum compound (which forms the subject-matter of my application, Serial No. 659,008, filed on the same date herewith) that will not melt and run during combustion, the main constituents of which briquets may be waste products—such as town's refuse, dried sewage sludge, and the like, for instance—otherwise commercially unburnable, or carbonaceous matter—such, for example, as coal-dust, peat, or the like—which it is desired to make of greater calorific value, or mixtures of such waste products and carbonaceous matter.

I carry out my invention as follows: I take a petroleum compound, such as described and claimed in my aforesaid application, which is made from a suitable quantity of petroleum; (by "petroleum" I mean any known or available mineral oils, which may be crude or otherwise, such as mineral-oil residue or refuse—for instance, "astatki,") to which are added small proportions of animal or vegetable stearin—that is to say, a solid fat or solid fatty acid—resin, lime, and sawdust, (or other similar absorbent,) the whole being mixed with the application of as little heat as possible in order to retain the maximum amount of volatile matter. The said ingredients are hereinafter referred to shortly as "stearin," "resin," "lime," and "sawdust." The proportions, which will vary according to circumstances, may, for example, be approximately as follows: To every one hundred and twenty-eight parts, by weight, of petroleum I add one part of animal or vegetable stearin, twelve parts of resin, eight parts of unslaked lime, and eight parts of sawdust, (preferably of a light and absorbent nature.) In the process of mixing I prefer to first melt the stearin and resin together in the same vessel, preferably in a steam-jacketed pan heated by low-pressure steam, using only the amount of heat necessary to melt the stearin and resin. If desired to thin the mixture, a little of the petroleum may be added at this stage, taking care to use as little heat as possible. I mix the lime and sawdust together, and I add them to and stir them in the petroleum, which, standing in its independent vessel, is of course cold. I then turn off steam from the pan and add the mixture of petroleum, lime, and sawdust to the other ingredients in the pan, agitating the whole thoroughly to insure a proper admixture. The resulting compound when cold is a fairly-hard substance; but if a harder or softer substance be required it may be made by using a different percentage of the ingredients. I therefore do not bind myself to the exact proportions of the various ingredients hereinbefore given, or the ingredients may be so proportioned that the mixture when cold is in a state somewhat approaching that of a fluid, which will set when mixed with small fuel or other such dust and made into briquets. The petroleum compound, supposing it to have been allowed to set, is first pulverized or divided, and a proportional amount thereof (from five to ten per cent. will generally be sufficient) is added at any convenient stage of the mixing process to the other matter, (referred to hereinafter as the "small fuel,") which is to be made into briquets with the addition of an agglutinant.

When the petroleum compound is used in a state somewhat approaching that of a fluid, it should be mixed with the small fuel of which the briquets are being formed at a stage suitable to its condition and also to that of the small fuel, as hereinafter explained, so that all may finally set together, (during pressing or after being pressed.)

When the compound is used in the solid form with a pulverizable agglutinant or binder, such as pitch, I prefer to add both the compound and the agglutinant to the small fuel and pulverize all together to insure a uniform mixture. The materials are then agglomerated by heat, pressed into briquets, and allowed to set.

When the compound is used, in a state somewhat approaching that of a fluid, with a pulverizable agglutinant, I add the compound after pulverization of the other ingredients has taken place, mixing all—viz., the small fuel, agglutinant, and compound—thoroughly together in a pug-mill and passing the mixed materials at once forward to be pressed into briquets, after which they are allowed to set.

When the compound is used, in a state somewhat approaching that of a fluid, with an agglutinant in a similar state, both may be added to the small fuel (which is preferably pulverized) in a pug-mill and there thoroughly mixed previous to being passed to the press, after which the briquets may be allowed to set. This setting at or after the pressing stage is the more important when the mixing-mill is also a heater—as, for instance, when pitch is used as an agglutinant. When the compound briquet material is heated, it should be pressed while hot.

Poor coal, peat, or other carbonaceous matter, town's refuse, sewage refuse, and the like may by the aid of the enriching compound be formed into burnable briquets, while good coal-dust may be further enriched in order to make therefrom briquets of higher calorific value for use, for instance, on board ships where the coal-bunker room is limited, and therefore valuable, especially on torpedo-boats, and also for use on motor-cars, where a fuel of high calorific value occupying a minimum space is required.

The agglutinants or binders which I prefer to use are simple ones—such as pitch, starch, and the like—as these are in no way detrimental to the compound.

Having now particularly described and ascertained the nature of my said invention and in what manner the same is to be performed, I declare that what I claim is—

1. The process of manufacturing an insoluble combustible material that will not melt or run while burning, said process consisting in first reducing to a state of division a combustible compound formed by mixing petroleum, resin, stearin, lime and sawdust, and then adding said divided compound to combustible waste products, and finally compressing the mixture thus formed into bricks or blocks.

2. The process of manufacturing an insoluble combustible material that will not melt or run while burning, said process consisting in first reducing to a state of division a combustible compound formed by mixing petroleum, resin, stearin, lime and sawdust, and then adding said divided compound and an agglutinant to combustible waste products, and finally compressing the mixture thus formed into bricks or blocks.

3. An insoluble combustible compound consisting of a mixture of petroleum, stearin, resin, lime and sawdust and other combustible material to be consumed.

4. An article of manufacture consisting of a compressed combustible brick or block that will not run or melt while burning, formed of combustible waste products, in admixture with a combustible compound formed by mixing petroleum, resin, stearin, lime and sawdust.

5. An article of manufacture consisting of a compressed waterproof combustible brick or block that will not run or melt while burning, formed of combustible waste products, in admixture with a waterproof agglutinant and a combustible compound formed by mixing petroleum, resin, stearin, lime and sawdust.

In testimony whereof I have signed my name to this specification in the presence of two subscribing witnesses.

JOHN WOOD LEADBEATER.

Witnesses:
WILLIAM SNOWDON,
ARTHUR SAMUEL RICKARDS.